US008404754B2

(12) United States Patent
Frost et al.

(10) Patent No.: US 8,404,754 B2
(45) Date of Patent: Mar. 26, 2013

(54) RECYCLING

(75) Inventors: Mark Frost, Buxton (GB); Fuquan Zeng, Cowling (GB); Victoria Sayer, St. Helens (GB)

(73) Assignee: Colormatrix Europe Limited, Knowsley (GB)

( * ) Notice: Subject to any disclaimer, the term of this patent is extended or adjusted under 35 U.S.C. 154(b) by 439 days.

(21) Appl. No.: 11/792,406

(22) PCT Filed: Dec. 5, 2005

(86) PCT No.: PCT/GB2005/004633
§ 371 (c)(1),
(2), (4) Date: Nov. 25, 2008

(87) PCT Pub. No.: WO2006/059127
PCT Pub. Date: Jun. 8, 2006

(65) Prior Publication Data
US 2009/0239961 A1    Sep. 24, 2009

(30) Foreign Application Priority Data

Dec. 4, 2004  (GB) .................................. 0426677.1

(51) Int. Cl.
*C08J 11/04* (2006.01)
(52) U.S. Cl. ........... 521/48; 521/40; 521/40.5; 528/271; 528/272; 528/308.1; 528/308.2; 528/488; 528/489; 528/499; 528/502 R; 428/35.7; 428/207; 428/480; 428/903.3

(58) Field of Classification Search .................... 521/40, 521/40.5, 46, 47, 48; 528/271, 272, 308.1, 528/308.2, 308.3, 308.8, 480, 481, 488, 489, 528/499, 502 R, 503; 428/35.7, 207, 346, 428/480, 903.3
See application file for complete search history.

(56) References Cited

U.S. PATENT DOCUMENTS

| 5,286,424 A | | 2/1994 | Su | |
| 6,147,129 A | * | 11/2000 | Schwartz, Jr. | 521/48.5 |
| 6,663,929 B1 | * | 12/2003 | Tabota et al. | 428/35.7 |
| 2003/0010360 A1 | * | 1/2003 | Klenk | 134/25.1 |
| 2004/0082672 A1 | * | 4/2004 | Zeng et al. | 521/48 |

FOREIGN PATENT DOCUMENTS

| DE | 198 39 147 | 3/2000 |
| EP | 1 411 078 | 4/2004 |
| EP | 0 924 678 | 9/2004 |
| WO | WO 2004/035296 | 4/2004 |

* cited by examiner

*Primary Examiner* — Frances Tischler
(74) *Attorney, Agent, or Firm* — Fay Sharpe LLP

(57) ABSTRACT

A process for recycling a coloured thermoplastic material comprising an absorbed disperse dye comprises contacting the optionally comminuted coloured thermoplastic material with a caustic wash and recovering an at least partly colour-modified thermoplastic composition from the caustic wash.

16 Claims, No Drawings

RECYCLING

This invention relates to moulded thermoplastic articles and to a process for recycling them, in particular to moulded thermoplastic articles provided with a colourant or additive and to a process for the recycling of such articles. In one of its aspects the invention relates to a process in which colour or additive applied to a moulded thermoplastic article in a post-moulding step is removed in a recycling process, and to articles produced by such a recycling process.

Polyethylene terephthalate is used on a large scale for the manufacture of food packages such as bottles. Such bottles are widely utilised for packaging of beverages, such as carbonated soft drinks, beer, or mineral water. Whilst some beverage bottlers prefer clear non-pigmented bottles, others prefer coloured bottles. Particularly in the case of bottles intended for holding carbonated drinks, a sandwich construction is used in which nylon or an ethylene-vinyl alcohol resin is incorporated in a multi-layer preform with polyethylene terephthalate in order to improve the gas barrier properties of the bottles. It has also been proposed, for the same purpose, to admix a polyamide with the polyethylene terephthalate since the presence of the polyamide provides gas barrier properties.

It is also often desirable to include in the bottle or other package one or more colourants or additives such as UV filters, oxygen absorbers, antimicrobial agents, antioxidants, light stabilizers, optical brighteners, processing stabilizers, flame retardants and the like.

The technique commonly used to manufacture bottles from moulding compositions comprising polyethylene terephthalate generally involves a two-stage process. In the first stage granules of the moulding composition are injection moulded to make a preform. In the second stage the preform is blow moulded to the desired shape.

Similar processing steps are used in the manufacture of bottles and other packages from other polyesters and from other thermoplastic materials generally.

In such a process the polyethylene terephthalate is typically post-condensed and has a molecular weight in the region of about 25,000 to 30,000. However, it has also been proposed to use a fibre grade polyethylene terephthalate, which is cheaper but is non-post-condensed, with a lower molecular weight in the region of about 20,000. It has further been suggested to use copolyesters of polyethylene terephthalate which contain repeat units from at least 85 mole % terephthalic acid and at least 85 mole % of ethylene glycol. Dicarboxylic acids which can be included, along with terephthalic acid, are exemplified by phthalic acid, isophthalic acid, naphthalene-2-6-dicarboxylic acid, cyclohexanedicarboxylic acid, cyclohexanediacetic acid, diphenyl-4,4'-dicarboxylic acid, succinic acid, glutaric acid, adipic acid, azelaic acid, and sebacic acid. Other diols which may be incorporated in the copolyesters, in addition to ethylene glycol, include diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, hexane-1,3-diol, 1,4-di-(hydroxyethoxy)-benzene,2,2-bis-(4-hydroxycyclohexyl)-propane, 2,4-dihydroxy-1,1,3,3-tetramethyl-cyclobutane, 2,2-bis-(3-hydroxyethoxyphenyl)-propane and 2,2-bis-(4-hydroxypropoxyphenyl)-propane. In this specification the term "polyethylene terephthalate" includes not only polyethylene terephthalate but also such copolyesters.

If the eventual bottle is to be coloured, then it is conventional to admix a colourant or colourants with the polyethylene terephthalate granules charged to the hopper of the injection moulding machine used to make the bottle preform. For this purpose the colourant or mixture of colourants can be added as a solid concentrate or in powder form or as a dispersion in a liquid carrier. Additives may also be added to the thermoplastic moulding composition at or around the same time, ie before moulding of the composition.

One important property of thermoplastic materials is their crystallinity. Crystallinity has a particular impact on both the light transparency and the tensile properties of the polymer. Crystallinity can be measured in numerous ways, for example volume change, heat capacity, enthalpy change, X-ray scattering, infra-red and Raman spectroscopy. Often for practical purposes the degree of crystallinity of a polymer, if pronounced or present over a wide area, can be judged by visual observation. However, it can be difficult visually to observe small areas of local crystallinity, particularly in a finished polymer product that is opaque.

WO-A-2004/035296, the disclosure of which is hereby incorporated by reference, addresses the need to provide a means for imparting colour, or imparting desirable additive properties, to a thermoplastic moulded article after, rather than before, moulding of the article. This allows the manufacturer to proceed with the moulding of the article before necessarily knowing what the final colour, or additive profile, of the article should be. In this way a bottle manufacturer may proceed with a large part of the bottle production process before finishing the product by the addition of one or more colours or additives. Orders for differently coloured products of the same shape and size, or for same shape and size products with different additive profiles can therefore be met more expeditiously than has hitherto been the case. There is also a need to provide a convenient method of assessing the degree of crystallinity of a thermoplastic moulded article that does not rely on difficult visual inspection or time-consuming analytical tests.

It has now been discovered that such coloured or additive-imparted thermoplastic articles may be effectively recycled, and that substantially colour-modified or additive profile-modified recycled product may thereby be realised.

According to the present invention there is provided a process for recycling a coloured thermoplastic material comprising providing a coloured thermoplastic material having a colourant chemically bound to the thermoplastic material on the surface thereof, but substantially none of the colourant being present within the core of the thermoplastic material substantially beneath the coloured surface; contacting the optionally comminuted coloured thermoplastic material with a caustic wash and recovering an at least partly colour-modified thermoplastic composition from the caustic wash.

According to the present invention there is further provided a process for recycling an additive-imparted thermoplastic material comprising providing an additive-imparted thermoplastic material having an additive chemically bound to the thermoplastic material on the surface thereof, but substantially none of the additive present within the core of the thermoplastic material substantially beneath the additive-imparted surface, contacting the optionally comminuted additive-imparted thermoplastic material with a caustic wash and recovering an at least partly additive profile-modified thermoplastic composition from the caustic wash.

The caustic wash is preferably alkaline, more preferably strongly alkaline, and most preferably a solution of an alkali metal hydroxide. Sodium hydroxide solution is particularly preferred.

When the caustic wash comprises a solution of an alkali metal hydroxide, the solution is preferably at least about 20% w/w, more preferably at least about 25% w/w, even more preferably at least about 30% w/w, and most preferably at least about 40% w/w. At least about 50% w/w is particularly preferred.

The caustic wash may be conducted at room temperature or below, or may alternatively be conducted at elevated temperature, for example at temperatures of at least about 30° C., or at least about 40° C., or at least about 50° C., or at least about 60° C., or at least about 75° C.

Preferably, the caustic wash is followed by a drying stage. The drying stage may comprise one, two, or more than two drying steps. Preferably at least one drying step comprises heating the washed thermoplastic material under substantially dry air conditions at a temperature of at least about 50° C., or at least about 75° C., or at least about 100° C., or at least about 150° C., or at least about 200° C. for a period of at least about 1 hour, or at least about 2 hours, or at least about 3 hours, or at least about 5 hours, or at least about 7 hours, or at least about 10 hours. At least about 200° C. is particularly preferred in some cases. At least about 4 hours is particularly preferred in some cases. A dry air kiln may be used to effect this drying step.

The drying step under heated dry air conditions may be preceded by an ambient drying step.

The drying stage may be followed by a water wash stage that, in turn may be followed by a further drying stage.

The caustic wash may be preceded by a comminution stage in which the thermoplastic material is comminuted.

The caustic wash may also, or instead, be preceded by other treatment stages to remove various contaminants that may be present in or on the thermoplastic material. For example, a dilute caustic wash (e.g. 2% NaOH) at moderately elevated temperature (e.g. 80° C.) may be used to remove adhesives, dirt, labels and the like. A separation stage may also be employed to separate the washed thermoplastic material (optionally comminuted—in which case it is a "washed flake") from such contaminants, and/or from other polymer materials.

Conveniently, the invention provides a method of recycling a coloured or additive-imparted thermoplastic material, wherein the colourant or additive is chemically bound in the surface region of the thermoplastic material, but wherein substantially no such colourant or additive is present in the core region of the thermoplastic material, comprising treating the thermoplastic material at least with a concentrated caustic wash for a protracted period under elevated temperature conditions, and optionally with one or more additional recycling steps as outlined above, for example, when the thermoplastic material is in the form of a bottle, in accordance with the known URRC method of recycling.

The URRC method, which can also be called the HybridUnPET process, polyethylene terephthalate bottles are mill-comminuted until they have reached a substantially uniform grain size. Paper and plastic labels are removed with air separators, and any adhesive-bonded labels are detached in a dilute caustic wash. After separation of the PET from such materials (polyolefin lids for example), the PET material is processed for use in the food industry: the ground PET flake is moistened with concentrated caustic soda in a mixing screw, so that the surface of the material detaches itself and any impure adhesives are removed. To achieve the best possible cleansing, this is followed by two further stages, before the material undergoes mechanical drying.

Preferably the thermoplastic material used in the recycling process of the invention is a coloured thermoplastic material manufactured in accordance with the method outlined in WO-A-2004/035296. Thus, the thermoplastic material may be obtained by providing a moulded material and/or a moulded article of a thermoplastic material, providing a colouration zone containing as a solution or dispersion in a liquid medium one or more colourants having a chemical affinity for the thermoplastic material of the moulded article, and in the colouration zone contacting the moulded article with the one or more colourants in the liquid medium for a period of time and under conditions effective to cause at least a portion of the one or more colourants to migrate from the liquid medium and bind to the moulded article.

Such a process allows the production of moulded thermoplastic articles that have a colourant chemically bound in the surface region of the material, but not in the core region thereof.

The thermoplastic material used in the recycling process of the invention may be an additive-imparted thermoplastic material manufactured in accordance with the method outlined in WO-A-2004/035296. Thus, the thermoplastic material may be obtained by providing a moulded material and/or a moulded article of a thermoplastic material, providing an additive impartation zone containing as a solution or dispersion in a liquid medium one or more additives having a chemical affinity for the thermoplastic material of the moulded article, and in the additive impartation zone contacting the moulded article with the one or more additives in the liquid medium for a period of time and under conditions effective to cause at least a portion of the one or more additives to migrate from the liquid medium and bind to the moulded article.

Such a process allows the production of moulded thermoplastic articles that have an additive chemically bound in the surface region of the material, but not in the core region thereof.

By "the core region" of the thermoplastic material is preferably meant any region of the thermoplastic material not at the surface region thereof, more preferably at a region removed from any surface of the thermoplastic material to substantially a maximum possible extent. Thus, if the thermoplastic material is in the shape of a cube, the core region most preferably comprises that region at the centre of the cube.

Said colourant or additive is preferably absorbed within the thermoplastic material. Said colourant or additive preferably penetrates the surface of the thermoplastic material. It may then be chemically bound in position by electrostatic forces, Van der Waals forces, hydrogen bonds and/or hydrophobic effects. Thus, by being chemically bound as described herein, the colourant or additive is suitably not solely held in position by adsorption or adhesion as a layer on a surface of the thermoplastic material.

Said colourant or additive may penetrate at least 0.01%, suitably penetrates at least 0.1%, preferably penetrates at least 1%, more preferably penetrates at least 2%, especially at least 3% of the thickness of the coloured thermoplastic material subjected to the process. Said colourant or additive suitably penetrates 20% or less, preferably 15% or less, more preferably 10% or less, especially 5% or less of the thickness of said coloured thermoplastics material subjected to the process.

Said colourant or additive may penetrate at least 0.02 µm, suitably at least 0.2 µm, preferably at least 2 µm, more preferably at least 3 µm, especially at least 4 µm below the surface of the coloured thermoplastic material subjected to the process. Said colourant or additive may penetrate less than 100 µm, suitably less than 50 µm, preferably less than 40 µm, more preferably less than 30 µm, especially less than 20 µm below the surface of the coloured thermoplastic material subjected to the process.

The ratio of the weight of dry thermoplastic material recovered after said caustic wash to the weight of said coloured or additive imparted thermoplastic material subjected to the process is suitably at least 0.60, preferably at least 0.70, more preferably at least 0.80, especially at least 0.90. The ratio may be less than 0.99, preferably less than 0.98, more preferably less than 0.97.

Said thermoplastic material may have a thickness before recycling of less than 1 mm, preferably less than 0.5 mm. The thickness may be in the range 0.1 to 0.5 mm, preferably 0.2 to 0.4 mm.

The process of the invention may comprise providing a thermoplastic moulding composition and subjecting said thermoplastic moulding composition to a moulding step thereby to form the moulded article which is then contacted with the one or more colourants in the colouration zone and then, after use of the moulded article, subjecting the moulded article to the recycling process of the invention.

Thus, the process of the invention may comprise providing a thermoplastic moulding composition, subjecting said thermoplastic moulding composition to a moulding step thereby to form a moulded article, and contacting the moulded article with a colourant having a chemical affinity for the moulded article for a period of time and under conditions effective to cause binding of the colourant to at least the surface of the moulded article which contacts the colourant and then, after use of the moulded article, subjecting the moulded article to the recycling process of the invention.

Also provided in accordance with the invention is a process for manufacturing a thermoplastic moulded article having additive-imparted functionality comprising providing a moulded article of a thermoplastic material, providing an additive impartation zone containing as a solution or dispersion in a liquid medium one or more additives having a chemical affinity for the thermoplastic material of the moulded article, and in the additive impartation zone contacting the moulded article with the one or more additives in the liquid medium for a period of time and under conditions effective to cause at least a portion of the one or more additives to migrate from the liquid medium and bind to the moulded article and then, after use of the moulded article, subjecting the moulded article to the recycling process of the invention.

The process of the invention may therefore comprise providing a thermoplastic moulding composition, subjecting said thermoplastic moulding composition to a moulding step thereby to form a moulded article, and contacting the moulded article with an additive having a chemical affinity for the moulded article for a period of time and under conditions effective to cause binding of the additive to at least the surface of the moulded article which contacts the additive and then, after use of the moulded article, subjecting the moulded article to the recycling process of the invention.

The additive may be any material that has a chemical affinity for the moulded article and which imparts a desirable property to the moulded article. Examples of types of additive include UV filters, oxygen absorbers, antimicrobial agents, antioxidants, light stabilizers, optical brighteners, processing stabilizers, flame retardants and the like.

In the processes described which comprise the aforementioned moulding step followed by contact with colourants, there may be an additional step of expanding the coloured moulded article (e.g. by blow moulding it) thereby to form an expanded coloured moulded article.

The colourant or additive suitably has a chemical affinity for the thermoplastic material that is recycled in the process of the invention. Such chemical affinity may be provided by means, for example, of electrostatic forces, Van der Waal's forces hydrogen bonds or hydrophobic effects. Different types of colourants and additives may be suitable for different types of thermoplastic material. If the thermoplastic material of the moulded article is predominantly polyethylene terephthalate or another polyester then the colourant may suitably be a disperse dye. However, if the thermoplastic material of the moulded article is nylon then the colourant may suitably be an acid dye, for example. One example of a suitable acid dye is Dyacid Turquoise Blue $V_B$.

Suitable disperse dyes include anthraquinone, indanthrone, monoazo, diazo, mithine, quinophthalone, perinone, naphthalidimide and thioindigo dyes. Examples of disperse dyes which may be suitable for use as colourants in the process of the invention include, but are not limited to, the Dispersol™ dyes available from Chemrez Incorporated at www.chemrez.com, the Terasil™ and Teratop™ dyes available from Ciba Specialties Chemicals Inc. at www.cibasc.com and the Palegal™ dyes available from BASF AG at www.basf.com. Disperse dyes are also commercially available from a variety of other suppliers including Bayer AG, notably their Dystar™ range.

Acid dyes, for use in the process of the invention when the thermoplastic material of the moulded article comprises nylon, are also available from these suppliers. Examples of suitable acid dyes include CI acid violet 90 (Dyalan Bordeux S-B 200% from Albion Colours) and CI acid EL17 (Dyacid yellow 2G from Albion Colours). Nylon under acidic conditions generally binds to dyes through the amino end group of the polymer. Under neutral dyeing conditions non-specific hydrophobic interactions and van der Waals forces make a considerable contribution, reinforcing the electrostatic binding between nylon and the acid dye.

The colourant composition may contain a single dye or a mixture of dyes depending upon the desired colouration of the article. For example, in order to produce an amber coloured bottle there may be required a mixture of a red dye, a yellow dye and a blue dye. At least one, and preferably all of such colourants are substantially removed from the thermoplastic material in the recycling process of the invention.

Examples of additives that may be suitable for removal in the recycling process of the invention include, but are not limited to, UV absorbers such as benzophenones, diphenyl acrylates, cinnamates and sterically hindered amines (HALS).

The conditions effective to cause binding of the colourant or additive to the thermoplastic material of the moulded article will vary depending on a number of factors, including the intended end result (ie. the depth of colour required, for example) as well as the type of colourant or additive and the type of thermoplastic material being used. The conditions effective to remove such colourant or additive from the thermoplastic material in the recycling process of the invention may also vary in accordance with the degree of chemical affinity between the colourant and/or additive and the thermoplastic material, and the amount of colourant/additive bound, and the surface depth of such binding. The degree of comminution and/or the concentration of the caustic wash and/or the temperature of the caustic wash and/or the longevity of the caustic wash and/or the drying temperature conditions may all be adjusted to achieve satisfactory results.

In a preferred embodiment of the invention described herein, a coloured thermoplastic material derived from a beverage container, for example a bottle, is recycled. The container may comprise a polyester, especially polyethylene terephthalate, with a disperse dye being absorbed in the polyester. The dye suitably was absorbed prior to a step wherein a perform for the container was expanded, for example blow moulded, to define the container to be recycled. The beverage container is suitably comminuted prior to contact with a caustic wash in the process described.

The invention is further illustrated in the following examples in which temperatures are in ° C. and parts and percentages are by weight.

EXAMPLE 1

A dye bath was prepared containing 5 parts of Dispersol Orange A-G™ in water at 90° C.

Eastman 9921 Polyethylene terephthalate granules which had been previously dried by heating for 4 hours at 170° C. were fed into the feed hopper of a Boy 80 injection moulding machine and extruded at about a temperature of 275° C. with a dwell time at this temperature of about 2 minutes to form a number of bottle preforms, each weighing 34.5 grams.

Each of the bottle preforms was colourless.

The bottle preforms were then partially submerged in the dye bath for a period of about 5 minutes.

On being withdrawn from the dye bath and dried it was found that each of the bottle preforms had a satisfactory colour.

These bottle preforms were then taken and subjected to the following steps:
- comminution to produce PET strips about 3 cm long and 1 cm wide
- caustic wash in 50% NaOH for 1 hour at ambient temperature
- ambient drying to obtain strips with caustic powder coating
- dry air kiln drying at 200° C. for 4 hours
- water wash
- ambient drying to produce PET strips substantially devoid of any colourant added during the aforesaid manufacturing process.

EXAMPLES 2 TO 5

A number of dye baths were prepared as described below:

| Dye-bath No. | Dispersed Dyestuff | % Dyestuff dispersed in water |
| --- | --- | --- |
| 1 | ICI Dispersol Orange A-G ™ | 5 |
| 2 | ICI Dispersol Blue B-2R ™ | 6 |
| 3 | ICI Dispersol Red B-2B ™ | 3 |

Eastman 9921 Polyethylene terephthalate granules, which had been previously dried by heating for four hours at 170° C., were fed into the feed hopper of a Boy 80 injection moulding machine and extruded at a temperature of 275° C. with a dwell time at this temperature of about 2 minutes, to form a number of colourless bottle preforms each weighing 34.5 grams.

The colourless bottle preforms were then partially submerged in the dyebaths described above for about 5 minutes at a temperature of 90° C. to produce examples 2 to 5 in a manner described below.

| | Example 2 | Example 3 | Example 4 | Example 5 |
| --- | --- | --- | --- | --- |
| Dye-bath No. | 1 | 2 | 3 | 1 & 2 |
| Dye Procedure | Partially submerge preform | Fully submerge preform | After partial submerge, fully submerge for relatively short period | Dip bottom half of preform in Bath 1, remove, dry, and submerge top half of preform in Bath 2 |
| Visual Effect | Orange base area only | Uniform colour | Colour gradient | Up to three colour zones depending on depth of submerge |

On being withdrawn from the dye bath and dried it was found that the Examples 2 to 5 each exhibited satisfactory colour and demonstrated the range of colour patterns possible with this technique These bottle preforms were then taken and subjected to the following steps:
- comminution to produce PET strips about 3 cm long and 1 cm wide
- caustic wash in 50% NaOH for 1 hour
- ambient drying to obtain strips with caustic powder coating
- dry air kiln drying at 200° C. for 4 hours
- water wash
- ambient drying to produce PET strips substantially devoid of any colourant added during the aforesaid manufacturing process.

EXAMPLE 6

A dye bath was prepared containing 5% of ICI Dispersol Orange A-GTM in water at 90° C.

Eastman 9921 Polyethylene terephthalate granules, which had been previously dried by heating for four hours at 170° C. together with 0.8% (on the weight of Polyethylene terephthalate) Premier Silver-11 281-019-11 (ColorMatrix), were fed into the feed hopper of a Boy 80 injection moulding machine and extruded at a temperature of 275° C. with a dwell time at this temperature of about 2 minutes, to form a number of bottle preforms exhibiting a metallic Silver appearance, each weighing 34.5 grams.

The bottle preforms were then partially submerged in the dye bath for a period of about 5 minutes On being withdrawn from the dye bath and dried it was found that the bottle preforms exhibited a satisfactory bicolour effect.

These bottle preforms were then taken and subjected to the following steps:
- comminution to produce PET strips about 3 cm long and 1 cm wide
- caustic wash in 50% NaOH for 1 hour
- ambient drying to obtain strips with caustic powder coating
- dry air kiln drying at 200 C for 4 hours
- water wash
- ambient drying to produce PET strips substantially devoid of any colourant added during the aforesaid manufacturing process.

EXAMPLES 7 TO 13

Dyebaths were prepared as described below and half litre bottle performs were each substantially fully submerged (whilst ensuring the bottle itself did not fill with dye) for a period of about 5 minutes

| Dyebath number | Dyestuff | Time in Dyebath | % Dyestuff disperse in water |
|---|---|---|---|
| 7 | Magnacron Rubine (Disperse red 167) | 3 mins | 0.2 |
| 8 | Keysperse Blue FBL (Disperse blue 54) | 5 mins | 0.5 |
| 9 | Elicron Violet RNS (Disperse Violet 33) | 5 mins | 1.0 |
| 10 | Magnacron Violet S3RL (Disperse violet 63) | 5 mins | 0.1 |
| 11 | Keytrans Blue 730 | 5 mins | 0.5 |
| 12 | Keytrans Blue 747 | 5 mins | 0.5 |
| 13 | Keytrans Red 925 | 5 mins | 0.5 |

On being withdrawn from the dyebath and dried it was found that each exhibited satisfactory colour.

These bottle performs were then blown and then the blown bottles were subjected to the following steps:
  comminution to produce PET strips about 3 cm long and 1 cm wide
  caustic wash in 50% NaOH for 1 hour
  ambient drying to obtain strips with caustic powder coating
  dry air kiln drying at 200 C for 4 hours
  water wash
  ambient drying
to produce PET strips substantially devoid of any colourant added during the aforesaid manufacturing process.

The structure of some dyes used are provided below.

Disperse Red 167

$O_2N$—⌬—N=N—⌬—N(CH$_2$CH$_2$OCOCH$_3$)$_2$
         |          |
         Cl         H—N
                    |
                    COC$_2$H$_5$

Disperse Violet 33

$H_3C$
         |
$O_2N$—⌬—N=N—⌬—N(CH$_2$CH$_2$OCOCH$_3$)$_2$
         |
         CN

Disperse Violet 63

$O_2N$—⌬—N=N—⌬—N(C$_2$H$_5$)$_2$
         |          |
         CN         H—N
                    |
                    COCH$_2$Cl

The invention claimed is:

1. A process for recycling a coloured moulded article comprising selecting a coloured blow-moulded article, wherein a thermoplastic blow-moulded material which defines the blow-moulded article is coloured by having a colourant chemically bound to the thermoplastic material of the blow-moulded article on the surface thereof, but substantially none of the colourant being present within the core of the thermoplastic blow-moulded material of the blow-moulded article substantially beneath the coloured surface; contacting the optionally comminuted coloured blow-moulded article with a caustic wash comprising at least 20% w/w alkali metal hydroxide and recovering colour-modified thermoplastic composition from the caustic wash which is substantially devoid of any colourant.

2. A process according to claim 1, wherein said colourant penetrates at least 0.01% of the thickness of the thermoplastic material.

3. A process according to claim 1, wherein said colourant penetrates at least 3 µm below the surface.

4. A process according to claim 1, wherein the ratio of the weight of dry thermoplastic material recovered after said caustic wash to the weight of said coloured thermoplastic material treated in the process is at least 0.6.

5. A process according to claim 1, wherein the coloured thermoplastic material has a thickness of less than 1 mm.

6. A process according to claim 1, wherein said coloured thermoplastic material comprises a disperse dye.

7. A process according to claim 1, wherein said thermoplastic material comprises a polyester.

8. A process according to claim 1, wherein said thermoplastic material comprises polyethylene terephthalate.

9. A process according to claim 5, wherein said coloured thermoplastic material is derived from a recyclable moulded article to which colour was imparted prior to an expansion step whereby the recyclable moulded article was formed.

10. A process according to claim 1, wherein said recyclable moulded article is derived from a coloured precursor moulded article by expansion of said precursor moulded article.

11. A process according to claim 1, wherein said recyclable moulded article is derived from a coloured precursor moulded article which was blow moulded to define said recyclable moulded article.

12. A process according to claim 1, wherein said coloured thermoplastic material is derived from a polyethylene terephthalate beverage container incorporating a disperse dye.

13. A process according to claim 1, wherein the caustic wash comprises caustic soda.

14. A process according to claim 9, wherein the caustic wash is conducted at at least 20° C.

15. A process according to claim 1, wherein the caustic wash is followed by a drying stage wherein the drying stage comprises drying the washed thermoplastic material under substantially dry air conditions at a temperature of at least about 50° C. over a period of at least about 2 hours.

16. The process of claim 1, wherein the caustic wash comprises at least about 40% w/w of the alkali metal hydroxide.

* * * * *